US011943599B2

(12) United States Patent
Patsouras et al.

(10) Patent No.: US 11,943,599 B2
(45) Date of Patent: Mar. 26, 2024

(54) VIBRATION ACTUATOR FOR RIGID STRUCTURES FOR HIGH-PERFORMANCE BASS PLAYBACK IN AUTOMOBILES

(71) Applicant: Continental Engineering Services GmbH, Frankfurt am Main (DE)

(72) Inventors: Dimitrios Patsouras, Frankfurt am Main (DE); Robert Joest, Frankfurt am Main (DE); Jens Friedrich, Frankfurt am Main (DE); Johannes Kerkmann, Frankfurt am Main (DE); Pascal Köhler, Frankfurt am Main (DE); Karsten Moritz, Frankfurt am Main (DE); Robert Wick, Frankfurt am Main (DE); Stephen Eisele, Frankfurt am Main (DE); Charalampos Ferekidis, Frankfurt am Main (DE); Philipp Neubauer, Frankfurt am Main (DE)

(73) Assignee: Continental Engineering Services GmbH (DE)

( * ) Notice: Subject to any disclaimer, the term of this patent is extended or adjusted under 35 U.S.C. 154(b) by 57 days.

(21) Appl. No.: 17/602,036

(22) PCT Filed: Apr. 9, 2020

(86) PCT No.: PCT/EP2020/060215

§ 371 (c)(1),
(2) Date: Oct. 7, 2021

(87) PCT Pub. No.: WO2020/208168

PCT Pub. Date: Oct. 15, 2020

(65) Prior Publication Data

US 2022/0150642 A1 May 12, 2022

(30) Foreign Application Priority Data

Apr. 11, 2019 (DE) ..................... 10 2019 205 278.9

(51) Int. Cl.
*H04R 23/00* (2006.01)
*H04R 1/10* (2006.01)
(Continued)

(52) U.S. Cl.
CPC ............. *H04R 9/18* (2013.01); *H04R 1/1075* (2013.01); *H04R 9/066* (2013.01); *H04R 31/006* (2013.01); *H04R 2400/03* (2013.01)

(58) Field of Classification Search
CPC ........ H04R 7/045; H04R 23/00; H04R 1/025; H04R 1/026
(Continued)

(56) References Cited

U.S. PATENT DOCUMENTS 4,412,317 A 10/1983 Asjes et al.
5,231,336 A 7/1993 van Namen
(Continued)

FOREIGN PATENT DOCUMENTS

CN 102714770 A 10/2012
DE 102016225722 A1 6/2018
(Continued)

OTHER PUBLICATIONS

German Search Report for German Application No. 10 2019 205 278.9, dated Dec. 6, 2019, with partial English translation, 9 pages.
(Continued)

*Primary Examiner* — George C Monikang
(74) *Attorney, Agent, or Firm* — Buchanan Ingersoll & Rooney PC

(57) ABSTRACT

An actuator for exciting a component of a motor vehicle with vibrations. The actuator has a housing, an electrical coil and a magnet that is movable to a limited extent in the housing.

18 Claims, 4 Drawing Sheets

(51) Int. Cl.
*H04R 9/06* (2006.01)
*H04R 9/18* (2006.01)
*H04R 31/00* (2006.01)

(58) Field of Classification Search
USPC ................................ 381/162, 164, 386–387
See application file for complete search history.

(56) References Cited

U.S. PATENT DOCUMENTS

| | | | |
|---|---|---|---|
| 5,973,422 | A | 10/1999 | Clamme |
| 6,501,357 | B2 | 12/2002 | Petro |
| 6,983,923 | B2 | 1/2006 | Fukui et al. |
| 7,078,832 | B2 | 7/2006 | Inagaki et al. |
| 7,449,803 | B2 | 11/2008 | Sahyoun |
| 7,586,220 | B2 | 9/2009 | Roberts |
| 7,671,493 | B2 | 3/2010 | Takashima et al. |
| 7,791,456 | B2 | 9/2010 | Miura |
| 7,911,098 | B2 | 3/2011 | Lee et al. |
| 8,013,480 | B2 | 9/2011 | Bang et al. |
| 8,097,991 | B2 | 1/2012 | Masami et al. |
| 8,188,623 | B2 | 5/2012 | Park et al. |
| 8,278,786 | B2 | 10/2012 | Woo et al. |
| 8,288,899 | B2 | 10/2012 | Park et al. |
| 8,575,794 | B2 | 11/2013 | Lee et al. |
| 8,736,086 | B2 | 5/2014 | Yang |
| 9,025,796 | B2 | 5/2015 | Furuichi et al. |
| 9,461,530 | B2 | 10/2016 | Wasenczuk et al. |
| 9,473,854 | B2 | 10/2016 | Yasuike et al. |
| 9,695,806 | B2 | 7/2017 | Van Brunt et al. |
| 9,815,085 | B2 | 11/2017 | Chun |
| 9,906,109 | B2 | 2/2018 | Endo et al. |
| 10,079,531 | B2 | 9/2018 | Xu et al. |
| 10,307,791 | B2 | 6/2019 | Xu et al. |
| 10,328,491 | B2 | 6/2019 | Xu et al. |
| 10,486,196 | B2 | 11/2019 | Chai et al. |
| 10,630,142 | B2 | 4/2020 | Kanaya et al. |
| 10,710,115 | B2 | 7/2020 | Huang et al. |
| 10,855,156 | B2 | 12/2020 | Matsuyama et al. |
| 2003/0102739 | A1 | 6/2003 | Yoneyama et al. |
| 2003/0146825 | A1 | 8/2003 | Kaneda et al. |
| 2004/0119343 | A1 | 6/2004 | Ueda et al. |
| 2005/0099255 | A1 | 5/2005 | Zhang |
| 2005/0112001 | A1 | 5/2005 | Bahnen et al. |
| 2005/0225181 | A1 | 10/2005 | Tu et al. |
| 2006/0002577 | A1 | 1/2006 | Won et al. |
| 2007/0052302 | A1 | 3/2007 | Cheung et al. |
| 2007/0085425 | A1 | 4/2007 | Hirashima |
| 2007/0182257 | A1 | 8/2007 | Miura et al. |
| 2007/0205674 | A1 | 9/2007 | Tseng et al. |
| 2009/0250032 | A1 | 10/2009 | Fullerton et al. |
| 2009/0320219 | A1 | 12/2009 | Takahashi et al. |
| 2011/0018364 | A1 | 1/2011 | Kim et al. |
| 2011/0018365 | A1 | 1/2011 | Kim et al. |
| 2011/0062803 | A1 | 3/2011 | Lee et al. |
| 2011/0068640 | A1 | 3/2011 | Choi et al. |
| 2011/0089773 | A1 | 4/2011 | Choi |
| 2011/0133577 | A1 | 6/2011 | Lee |
| 2011/0193426 | A1 | 8/2011 | Chung et al. |
| 2011/0193427 | A1 | 8/2011 | Lemieux |
| 2011/0198948 | A1 | 8/2011 | Keisuke et al. |
| 2011/0198949 | A1 | 8/2011 | Furuich et al. |
| 2011/0254385 | A1 | 10/2011 | Makino et al. |
| 2011/0291497 | A1 | 12/2011 | Choi |
| 2012/0032535 | A1 | 2/2012 | Park |
| 2012/0039491 | A1 | 2/2012 | Katz |
| 2012/0098380 | A1 | 4/2012 | Wang et al. |
| 2012/0109029 | A1 | 5/2012 | Ma |
| 2012/0146557 | A1 | 6/2012 | Pyo et al. |
| 2012/0169148 | A1 | 7/2012 | Kim et al. |
| 2012/0293022 | A1 | 11/2012 | Park |
| 2013/0033128 | A1 | 2/2013 | Yoon |
| 2013/0033129 | A1 | 2/2013 | Hong |
| 2013/0043766 | A1 | 2/2013 | Takahashi et al. |
| 2013/0076162 | A1 | 3/2013 | Papakyriacou et al. |
| 2013/0099600 | A1 | 4/2013 | Park |
| 2013/0285479 | A1 | 10/2013 | Kinoshita |
| 2014/0009008 | A1 | 1/2014 | Li et al. |
| 2014/0062225 | A1 | 3/2014 | Kim et al. |
| 2014/0103751 | A1 | 4/2014 | Furukawa et al. |
| 2014/0132089 | A1 | 5/2014 | Jeon |
| 2014/0265651 | A1 | 9/2014 | Kim et al. |
| 2015/0172821 | A1 | 6/2015 | Lee et al. |
| 2015/0194870 | A1 | 7/2015 | Kim et al. |
| 2015/0296280 | A1 | 10/2015 | Lee |
| 2016/0126821 | A1 | 5/2016 | Iwaki et al. |
| 2016/0149517 | A1 | 5/2016 | Choi et al. |
| 2016/0149518 | A1 | 5/2016 | Wang et al. |
| 2016/0190903 | A1 | 6/2016 | Ohishi et al. |
| 2017/0033653 | A1 | 2/2017 | Wang et al. |
| 2017/0033673 | A1 | 2/2017 | Wang et al. |
| 2017/0288523 | A1 | 10/2017 | Katada |
| 2017/0328441 | A1 | 11/2017 | Kanaya et al. |
| 2017/0346376 | A1 | 11/2017 | Kim et al. |
| 2018/0026514 | A1 | 1/2018 | Mao et al. |
| 2018/0297074 | A1 | 10/2018 | Huang et al. |
| 2019/0267882 | A1 | 8/2019 | Matsuyama et al. |
| 2021/0328491 | A1 | 10/2021 | Takahashi et al. |
| 2022/0123642 | A1 | 4/2022 | Takahashi et al. |

FOREIGN PATENT DOCUMENTS

| | | | |
|---|---|---|---|
| EP | 0653331 | A1 | 5/1995 |
| EP | 2992972 | A1 | 3/2016 |
| GB | 806331 | A | 12/1958 |
| JP | 2005106242 | A | 4/2005 |
| JP | 2013529436 | A | 7/2013 |
| JP | 2013223334 | A | 10/2013 |
| KR | 101586766 | B1 | 1/2016 |
| WO | 9502275 | A1 | 1/1995 |
| WO | 2010076656 | A2 | 7/2010 |
| WO | 2010113038 | A2 | 10/2010 |
| WO | 2011104659 | A2 | 9/2011 |
| WO | 2011158434 | A1 | 12/2011 |
| WO | 2012064799 | A1 | 5/2012 |
| WO | 2016124684 | A1 | 8/2016 |
| WO | 2020045470 | A1 | 3/2020 |

OTHER PUBLICATIONS

German Examination Report for German Application No. 10 2019 205 278.9, dated Dec. 6, 2019, with English translation, 8 pages.
International Search Report and Written Opinion for International Application No. PCT/EP2020/060215, dated Jul. 3, 2020, with partial English translation, 9 pages.
Japanese Notice of Reasons for Refusal for Japanese Application No. 2021-560434, dated Oct. 20, 2022 with translation, 12 pages.
Korean Request for the Submission of an Opinion for Korean Application No. 10-2021-7032179 dated Jul. 1, 2023 with translation, 13 pages.
Final Office Action for U.S. Appl. No. 17/509,449, dated Sep. 14, 2023, 22 pages.
Extended European Search Report for European Application No. 21204967.0, dated Mar. 24, 2022, with translation, 12 pages.
German Examination Report for German Application No. 10 2020 213 768.4, dated Apr. 8, 2021, with translation, 9 pages. 2021.
Wikipedia The Free Encyclopedia, "Electrical Resistivity and Conductivity" downloaded from https://en/wikipedia/wiki/Electrical_Resistivity_and_Conductivity, Mar. 1, 2023, 29 pages.
Non Final Office Action for U.S. Appl. No. 17/509,449, dated Mar. 8, 2023, 24 pages.
Chinese Office Action for Chinese Application No. 202080027668.9, dated Oct. 31, 2023 with translation, 13 pages.

VIBRATION ACTUATOR FOR RIGID STRUCTURES FOR HIGH-PERFORMANCE BASS PLAYBACK IN AUTOMOBILES

CROSS REFERENCE TO RELATED APPLICATIONS

This application is the U.S. National Phase Application of PCT International Application No. PCT/EP2020/060215, filed Apr. 9, 2020, which claims priority to German Patent Application No. 10 2019 205 278.9, filed Apr. 11, 2019, the contents of such applications being incorporated by reference herein.

FIELD OF THE INVENTION

The invention relates to an actuator for exciting at least one component of a motor vehicle with vibrations, to a component arrangement with such an actuator and to a motor vehicle with such a component arrangement.

BACKGROUND OF THE INVENTION

In motor vehicles nowadays, entertainment systems which allow audio playback from sources such as radio, CD or electronic recordings are standard. For balanced audio playback in vehicles, the audio signal is usually divided into different frequency ranges and reproduced using elements that have been optimized in each case for this purpose. The reproduction of low tones requires loudspeakers that are sufficiently heavy and large, and large volumes, in order to produce a correspondingly powerful sound. In the vehicle interior, however, only small volumes are usually available without restricting the usable space. Furthermore, the typically heavy weight of such loudspeakers has a negative effect on fuel consumption and thus also on pollutant emissions and range.

Loudspeakers for reproducing particularly low tones are frequently already installed in a housing integrated in the vehicle interior. This already includes the resonance volume adapted for the loudspeaker. However, such loudspeaker-housing combinations have the aforementioned disadvantages, such as, in particular, a large volume and a high weight.

SUMMARY OF THE INVENTION

Therefore, an aspect of the invention is an alternative and/or improved possibility for audio playback in motor vehicles.

According to an aspect of the invention, this is achieved by an actuator, a component arrangement and a motor vehicle in accordance with the respective main claims. Advantageous embodiments can be found, for example, in the respective dependent claims. The content of the claims is incorporated in the content of the description by express reference.

An aspect of the invention preferably relates to an actuator for exciting at least one component of a motor vehicle with vibrations. The actuator has a housing which is configured to be connected to the component. The actuator has an electrical coil which is rigidly connected to the housing and is configured to generate a magnetic field when an electrical current flows through it. Furthermore, the actuator has a magnet which is arranged in the housing so as to be movable to a limited extent. The at least one component which is excited to vibrate by the actuator is particularly preferably a structure of a plurality of components, very particularly preferably comprising the housing.

The actuator can preferably excite such components to vibrate in a suitable manner, which vibrations in turn can then emit airborne sound. The use of such actuators in motor vehicles allows a considerable saving on space and weight compared to known loudspeakers used in motor vehicles.

It is expedient that the actuator for a rigid structure is designed as a component to be excited for high-performance bass playback in automobiles. The actuator itself does not emit sound, but rather excites structures that are present in any case in the vehicle, at least one of which is in the form of a component to be excited, to vibrate. As a result of this excitation, the structure forms vibrations and ultimately emits sound in an advantageous manner compared to conventional subwoofers. No additional resonance volume is necessary here. The space required is reduced to a minimum. The actuator is advantageously smaller by a factor of 5-10 and lighter by a factor of 2-5 than a conventional subwoofer. The performance of the bass playback—especially with regard to extreme power peaks and permanent maximum loading—far exceeds that of conventional subwoofers.

One purpose of the actuator can be, for example, to generate vibrations in order to emit airborne sound or to reproduce sound by means of (a) suitable structure(s).

The structure expediently comprises a plurality of components, in particular components which are connected to one another and are jointly or partially excited to vibrate.

The actuator is preferably configured such that it is particularly suitable for reproducing low tones or for bass playback, wherein the actuator is suitable or is even suitable for frequencies below 100 Hz or 200 Hz, in particular below 100 Hz or 200 Hz down to at least 60 Hz, particularly preferably down to at least 40 Hz, in each case expediently with an amplitude drop of up to −6 dB, in particular −3 dB.

The actuator is expediently configured to reproduce a maximum sound pressure level of at least 100 dB.

In particular, the actuator is designed in such a way that it can continuously generate a sound pressure level of at least 80 dB for at least one hour.

The housing of the actuator is preferably connected directly to the component or indirectly via at least one fastening means. The link between housing and component is directly or indirectly configured there in particular to be substantially rigid and/or stiff.

The component is expediently configured as one of the following structures of a motor vehicle: floor panel, door structure panel, trunk lid, spare wheel recess, roof structure, cross member, fender, longitudinal member, door carrier, end wall or frame part and in particular as one of the following structures: floor panel, trunk lid or end wall. This structure is particularly preferably configured as a carbon and/or glass fiber reinforced plastic GFRP and/or carbon fiber reinforced plastic CFRP.

The preferred rigid arrangement of the electrical coil in the housing effectively prevents relative movements between the coil and the housing. In this way, abrasion of components that may rub against one another can be prevented. This also applies to a cable for connecting the electrical coil, which will be discussed in greater detail below.

The vibrations are preferably mechanical vibrations. This can be expressed, for example, in a vibration of the actuator. Such vibrations can be transmitted to at least one component, which then also executes corresponding vibrations. The vibrations of the actuator are preferably vibrations which, in particular after being transmitted to at least one component, lead to the emission of airborne sound waves or to the generation of sound waves which then propagate further through the air. In particular, the vibrations can have frequencies of between 20 Hz and 20 kHz, which roughly corresponds to a typical human hearing range.

The actuator preferably has an electrical connection, for example by means of a plug-in or clamping connection, which can be fully or partially integrated in the housing and is electrically connected to the coil. A cable, for example, can be used for this purpose. Said cable can form an electrical link between connection and coil. Such a cable can also be used, for example, to arrange the electrical connection away from the housing.

The electrical connection is advantageously rigidly connected to the housing. In this way, in particular, a relative movement between electrical connection and housing can be prevented, which can avoid abrasion.

An electrical link between electrical connection and coil is preferably completely secured on the housing. As a result, a relative movement between the electrical link, for example a cable, and the housing can be effectively prevented. This avoids friction and fatigue of the materials and thus wear or abrasion.

The magnet can preferably be excitable and/or deflectable, in particular by means of the magnetic field generated by the coil. Vibrations can thereby be generated.

The magnet can preferably be movable in only one spatial direction defined in the housing. A spatial direction can correspond here to a combination of one direction and an exactly opposite direction. In other words, the magnet can be moved one-dimensionally along an axis defined in the housing.

The actuator preferably has a spring arrangement which is configured to bias the magnet into an inoperative position. From said inoperative position, the magnet can then be deflected, in particular by means of the already mentioned magnetic field generated by the coil.

The spring arrangement can preferably be configured to bias the magnet in a manner returning same back to the inoperative position along every possible direction of movement. The possible directions of movement can be, for example, those directions which are defined by the spatial direction already mentioned further above.

The spring arrangement preferably has a first spring element and a second spring element, wherein the magnet is held between the first spring element and the second spring element. The first spring element preferably biases the magnet in a first direction. The second spring element preferably biases the magnet in a second direction or orientation opposite to the first direction. This can be particularly advantageous if the magnet, as already mentioned above, is correspondingly movable in one spatial direction or only one-dimensionally. The magnet is then biased in both directions by the spring arrangement.

Alternatively, it is preferably also possible to use only one spring element which, for example, can generate a bias in one or also in all relevant directions.

The spring element or the first spring element preferably has a number of spring arms for biasing the magnet. The second spring element also preferably has a number of spring arms for biasing the magnet. Such an embodiment has been found to be advantageous for typical applications. The magnet can be attached in particular at a respective point at which the spring arms come together.

The spring arms of the first spring element can preferably be arranged in a star shape or in a spiral shape. The spring arms of the second spring element can also preferably be arranged in a star shape or in a spiral shape. The magnet can be fastened, for example, in the center of such a star shape, with the spring effect resulting therefrom proving to be advantageous.

The arrangement of the spring arms is expediently configured symmetrically or, alternatively, is preferably configured asymmetrically, in order to prevent natural vibrations. The asymmetry here is particularly preferably configured as a rotational asymmetry or as a translational asymmetry.

The material thickness of the spring elements can preferably be configured to be constant or, in particular, to be of different thickness. It is expedient to provide different thicknesses at different points of the spring elements in order to achieve special vibration properties and special return characteristics of the spring. For example, a spring element can obtain a more pronounced progressive return characteristic curve by means of a profiling.

At least one spring arm or the spring arms and/or at least one spring element is expediently configured to be profiled in order to further improve the rigidity and the vibration properties. The profiling here is particularly preferably carried out by at least one rib and/or at least one bead and/or at least one edge and/or at least one curvature, very particularly preferably for each spring arm and/or each spring element.

The first spring element and the second spring element are preferably arranged within the housing at the greatest possible distance from one another and/or are arranged at opposite ends of the housing. As a result, the best possible generation of the spring force can be achieved in particular to the effect that a position of the housing can be freely selected. The magnet is suitably biased into its inoperative position in any position of the housing relative to the Earth's surface or to some other external element and can be deflected as intended by the magnetic field without restriction. The greatest possible distance can refer here in particular to the spatial direction already mentioned above, which indicates an axial movement of the magnet.

The spring elements can be formed, for example, from plastics, metals or composite materials. The acoustic behavior can thereby be influenced. In particular, the damping behavior of the spring elements can be influenced in this way.

The spring elements are particularly preferably, in particular additionally, coated, for example with one or more plastics with relatively high damping or with relatively massive materials, in order to dampen and/or to detune the natural vibration behavior of the spring elements.

The magnet can preferably be movable within the coil. The movability within the coil achieves a particularly good effect of the magnetic field generated by the coil.

The actuator preferably has a ring as a housing or housing part which surrounds the coil and is formed from magnetically conductive and/or thermally conductive material. Formation from magnetically conductive material enables a magnetic connection to be generated to the side of the coil in a preferred manner. This considerably improves the effect of the magnetic field generated by the coil.

The housing of the actuator is preferably formed from a material with a heat conductivity of at least 25 W/(m K), in particular of at least 40 W/(m K). This enables a particularly advantageous dissipation of heat arising in the interior of the housing. This heat can arise in particular from the current flowing through the coil and possible friction effects due to the moving magnet. The formation from thermally conductive material enables this heat to preferably be dissipated, for example to components connected to the housing or to the component to be excited. Overheating of the actuator is thereby advantageously prevented.

The housing of the actuator preferably has a heat capacity of at least 0.08 kJ/K, in particular of at least 0.1 kJ/K. Owing to this particularly high specific heat capacity, high heat input arising because of temporary load peaks can be absorbed by the coil.

The fixed connection of the coil to the housing can preferably be produced by an adhesive connection of thermally relatively highly conductive adhesive. The adhesive here has a thermal conductivity of at least 0.8 W/(m K), in particular at least 1 W/(m K). The layer thickness of the adhesive here is expediently a maximum of 0.3 mm, in particular less than 0.1 mm. This ensures efficient heat dissipation from the coil into the housing.

It is preferred that the coil carrier of the coil fixedly connected to the housing is formed from a thermally relatively highly conductive material with a thermal conductivity of at least 0.8 W/(m K), in particular at least 1 W/(m K), in order to ensure efficient heat dissipation from the coil into the housing.

It is preferred that the inner surface of the housing, which is connected to the coil and/or to the coil carrier by means of an adhesive connection, is structured and/or profiled. The inner surface or the surface of the interior of the housing, in particular in the region in which it is connected to the coil and/or to the coil carrier, has, for example, rectangular profiles and/or triangular profiles and/or sinusoidal profiles and/or circular arc profiles as surface structuring, in order to ensure efficient heat dissipation from the coil into the housing by means of an increase in the contact surface. Additionally or alternatively, further profilings/ribs can expediently be attached on the outside of the housing, ensuring an improved transfer of heat to the environment.

According to a preferred embodiment, the housing has a first cover cap at a first axial end with respect to the coil. This can be formed in particular from plastic, from a non-magnetically conductive and/or from a non-thermally conductive material or from a thermally conductive material. The housing can also have a second cover cap at a second axial end with respect to the coil. This can also be formed in particular from plastic, from a non-magnetically conductive and/or from a non-thermally conductive material or from a thermally conductive material.

Owing to the particularly preferred formation of a respective cover cap from non-magnetically conductive material, a magnetic flux can be kept wholly or partially in the housing, which prevents, for example, interference with other components. As a result of the formation from non-thermally conductive material, heat emission from the actuator to a contacting element can be prevented or reduced.

Plastics such as PA6 (polyamide 6), ABS (acrylonitrile-butadiene-styrene copolymer) or PP (polypropylene) are preferably used as non-thermally conductive, non-magnetically conductive materials.

In particular, a three-part construction of the housing, i.e. with a ring and two cover caps, can be provided.

However, a respective cover cap can also be designed to be thermally conductive, for example. In particular, it can be designed at the same time not to be magnetically conductive. As a result, heat can be given off to another element, which prevents the actuator from overheating. For example, aluminum or magnesium can be used as a thermally conductive and non-magnetically conductive material.

The housing preferably has an externally accessible bore with an internal thread or another fastening means accessible from the outside. Such a fastening means can also be designed, for example, as a through hole without a thread or in another suitable manner. As a result, the housing can be additionally fastened, for example, rigidly to a different element than the already mentioned component of the motor vehicle, for example to a body or to a floor of the motor vehicle. As a result, a reference to another element, in particular a more rigid element, can be established such that the component can be excited in an advantageous manner.

The magnet preferably has a mass which is in a range of between 80% of the mass of the other components of the actuator and 120% of the mass of the other components of the actuator. Such values have proven to be advantageous, in particular from an acoustic point of view.

The housing can preferably be designed to be completely or substantially radially symmetrical. This has proven to be a design that is simple to produce and to use. However, other designs, for example a tetragonal, square or rectangular design or a design with a different number of corners are also possible.

The housing can be designed, for example, to be closed, open or partially open. A closed design can in particular achieve a certain level of protection against the ingress of dust, liquids or other contaminants.

The magnet preferably has a magnetic central part, a first pole plate and a second pole plate. The central part is preferably surrounded here by the first pole plate and the second pole plate. The magnetic central part can in particular be arranged along a single possible direction of movement of the magnet or the spatial direction between the first pole plate and the second pole plate. Such designs have proven to be advantageous.

The first and/or second pole plate are preferably assigned to the magnet, in particular on two opposite sides, the magnet between the pole plates, particularly preferably in the center, in the undeflected state of the actuator.

The outwardly directed surface of an expedient first pole plate, i.e. facing away from the magnet, with the pole plate being assigned to the magnet, is preferably concave, in particular with respect to its cross section, and therefore said surface has a greater thickness at the outer edge than in its center. The transition between the thicker, outer edge and the thinner central part is in particular designed here in a manner sloping linearly or sloping in the shape of a circular arc or sloping parabolically. Furthermore, along its outer edge, in particular the outer edge of the outwardly directed surface, the pole plate particularly preferably has a collar, in particular of substantially constant thickness, which can have up to 20% of the total extent of the pole plate. The surface of the first pole plate which is oriented toward the magnet is expediently designed to be substantially planar.

Likewise, a second pole plate is preferably formed on its outwardly directed side in the same manner as the first pole plate on its outwardly directed surface. In particular, the side or surface oriented toward the magnet is also substantially planar in the case of the second pole plate. Such a design can have the effect, firstly, that the magnetic flux density in the outer region of the pole plates is higher and, secondly, a respective adjacent spring element can be arranged closer to the pole plate. As a result, construction space can be saved overall.

The first and/or second pole plate are expediently configured with regard to their outwardly directed surface in such a way that they have a substantially planar partial surface or a plateau in their center.

It is expedient that the first and/or the second pole plate is substantially planar on the side facing the magnet and the side facing away from the magnet or outer side is concave with respect to its cross section and thus the entire cross section of the pole plate is concave. The outer side of the first and/or the second pole plate has a collar, in particular on the circumferential edge, at which collar the pole plate has a greater thickness or material thickness than in the center, wherein the pole plate(s) in the region of the center of the outer side, in particular in each case, has/have a substantially planar plateau. The transition between collar and plateau is particularly preferably designed here as a linear transition or a circular-arc-shaped transition or a parabolic transition or a combination of two or three of these transition shapes.

The magnet or the magnetic central part can be composed of a neodymium alloy or a ferrite alloy, for example.

An aspect of the invention furthermore preferably relates to a component arrangement for a motor vehicle, wherein the component arrangement has at least one component for the motor vehicle and an actuator according to an aspect of the invention. The actuator is connected rigidly here to the component. With regard to the actuator, reference can be made to all the embodiments and variants described herein.

By means of the preferred and/or inventive component arrangement, simple excitation of the component with vibrations that generate sound waves is possible, such that the component can be used as part of a system for audio playback in the motor vehicle. Compared to a separate loudspeaker, which typically requires a separate diaphragm, is considerably more space-intensive and is heavier, the component arrangement according to an aspect of the invention enables considerable savings in terms of space and weight.

An aspect of the invention furthermore relates to a motor vehicle which has at least one component arrangement according to an aspect of the invention. With regard to the component arrangement and in particular with regard to the actuator contained therein, reference can be made to all the embodiments and variants described herein. The advantages already described above can be achieved in this way, in particular the motor vehicle can have more space and/or a lower weight compared to embodiments with conventional loudspeakers.

An aspect of the invention furthermore relates to the use of an actuator, in particular an actuator according to an aspect of the invention, in a motor vehicle. With regard to the actuator according to an aspect of the invention, reference can be made to all the embodiments and variants described herein.

In general, an actuator or vibration exciter can be described which does not itself emit sound, but rather excites existing structures in the vehicle. This excitation causes the structure to vibrate, whereupon it emits sound itself. Compared to an equivalent subwoofer, the actuator is typically smaller by a factor of 5 to 10 and lighter by a factor of 2 to 5.

Actuators, depth actuators or vibration exciters, as described herein, can preferably have the following features, for example, which can be used individually or in combination:

- The coil of the actuator is directly connected to the outer housing, for example adhesively bonded or connected in some other way, the magnet typically being located on the inside, for example inside the coil diameter, and typically being mounted movably.
- An outer ring as a housing or housing part, to which the coil can be fastened, for example, can be composed of a thermally conductive metal or material, wherein the ring can, for example, close a magnetic flux circuit and can also dissipate the heat generated by the coil to the outside and on the outer side to the environment.
- The actuator can be installed in a wide variety of positions in and outside the vehicle. It can preferably be attached to sheet metal structures such as a floor panel, to a door structure panel, to a trunk lid, a spare wheel recess, a roof structure, a cross member, a fender, a longitudinal member, an end wall or to other components of a motor vehicle.
- The actuator can be positioned in all spatial directions with the same suitability. This can be made possible in particular by centering the magnet system or the magnet on planes that are as far apart from one another as possible.
- The centering and the suspension of the magnet system can be implemented in one component, which can be composed of different materials such as, for example, plastics, metals or composite materials, as a result of which the acoustic behavior can be influenced or optimized.
- The actuator can have a central hole that is continuous from top to bottom in order to be able to fasten the actuator centrally on a bolt.
- The mass of the movable magnet system or core can be, for example, approximately ±20% of the mass of the outer core or the other components of the actuator. As a result, the actuator can be operated both above and below its own resonance frequency.
- The actuator housing can in principle be designed in various forms, but a symmetrical design may be advantageous for assembly and also for production.
- Materials can be designed differently, for example. The magnet can be composed, for example, of a neodymium alloy or a ferrite alloy. Furthermore, the housing can be designed to be open or partially open. Apart from the central hole already mentioned, the actuator can also be connected via an external fastening or an adhesive or welded connection. A structure is also conceivable in which the magnet system is not completely located within the coil diameter, wherein the coil can also be partially enclosed by the magnet.

BRIEF DESCRIPTION OF THE DRAWINGS

Further features and advantages will be gathered by a person skilled in the art from the exemplary embodiments described below with reference to the appended drawing.

In the drawings.

DETAILED DESCRIPTION OF THE PREFERRED EMBODIMENTS

Figure 1:
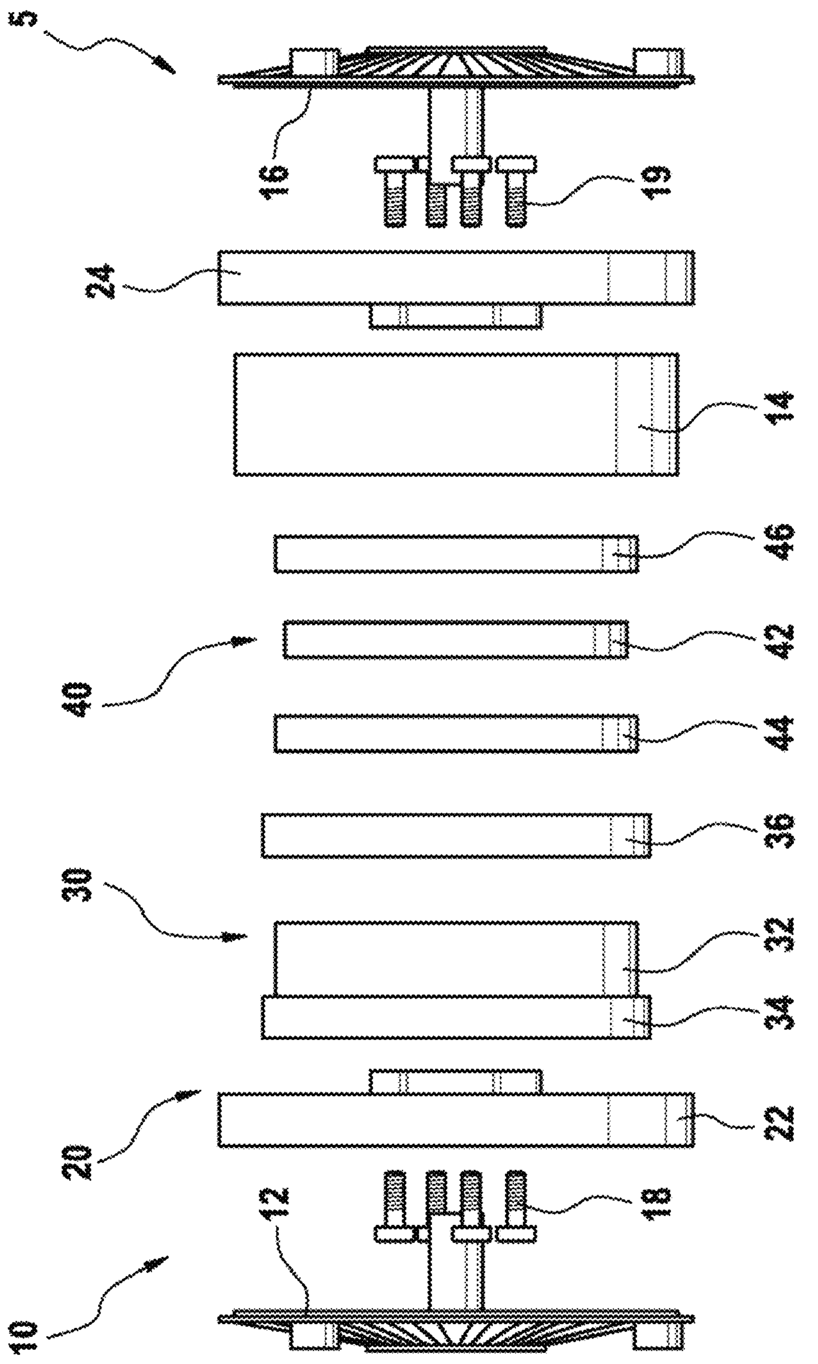
FIG. 1: shows an actuator in a lateral exploded view.

FIG. 1 shows an actuator 5 according to one exemplary embodiment of the invention in a lateral exploded view.

The actuator 5 has a housing 10. The housing 10 is formed by a first cover cap 12, a second cover cap 16 and a ring 14. The two cover caps 12, 16 are arranged on the outside and are composed of non-thermally conductive, non-magnetically conductive material. It should be mentioned that one or both of said two cover caps 12, 16 could, however, also be composed, for example, of thermally conductive, non-magnetically conductive material. The ring 14 is composed of thermally conductive, magnetically conductive material.

The actuator 5 has a spring arrangement 20 which is formed by a first spring element 22 and a second spring element 24. The design thereof will be discussed in more detail further below.

The actuator 5 has a coil which is formed by a coil carrier 32, a first coil section 34 and a second coil section 36. The two coil sections 34, 36 are attached here to the coil carrier 32. Electric current can flow through the coil sections 34, 36, such that a magnetic field is generated in the coil 30.

The actuator 5 has a magnet 40. The latter is formed by a magnetic central part 42 and by a first non-magnetic pole plate 44 and a second non-magnetic pole plate 46. The central part 42 is accommodated here between the two pole plates 44, 46.

Two sets of four screws 18, 19 each are used to fasten the components mentioned. Alternatively, for example, fastening by adhesive bonding, welding or riveting would also be possible.

Figure 2:
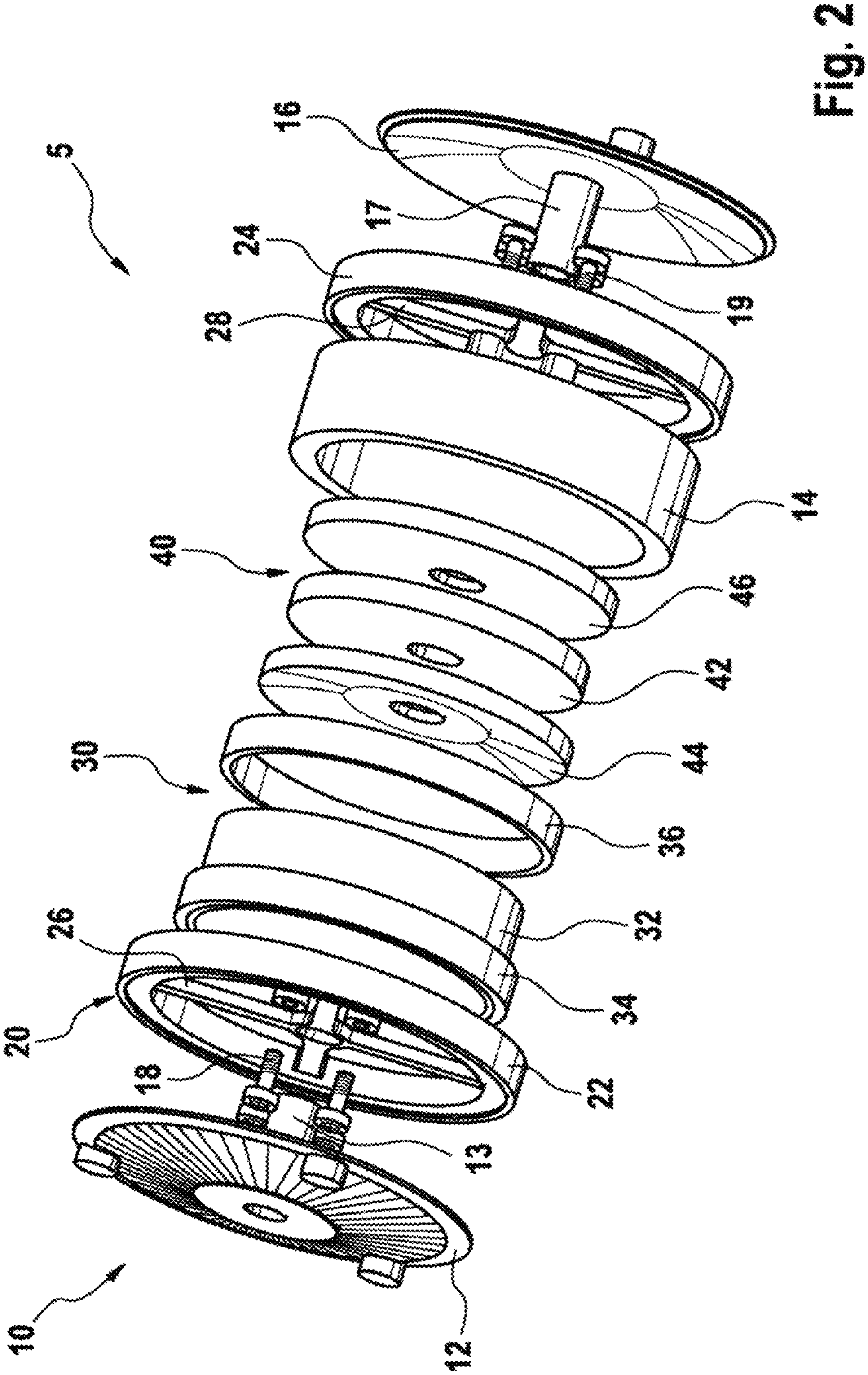
FIG. 2: shows the actuator in a perspective exploded view.

FIG. 2 shows the actuator 5 in a perspective exploded view. It can be seen here that the first spring element 22 has a total of four spring arms 26. Accordingly, the second spring element 24 has a total of four spring arms 28.

In the assembled state, the magnet 40 is designed in such a way that the two pole plates 44, 46 directly adjoin the magnetic central part 42. The magnet 40 is then held as a whole by the two axially adjacent spring elements 22, 24. As a result, the magnet 40 is movable only in one axial direction, wherein it is biased by the spring elements 22, 24 into a central inoperative position.

As shown, the pole plates 44, 46 are designed to be curved concavely on their outwardly directed surface. This enables a particularly space-saving arrangement of the magnet 40 between the spring elements 22, 24 and allows a particularly high magnetic flux density in the edge region of the pole plates.

In the assembled state, the coil 30 surrounds the magnet 40 radially. The coil 30 here is fixedly secured in the housing 10. By application of an electrical voltage to the coil 30, the magnet 40 can be deflected out of its inoperative position, as a result of which vibrations occur. In particular, a voltage to which an audio signal is modulated can be applied here. The magnet 40 then vibrates in accordance with this audio signal and generates corresponding vibrations. The ring 14 made of magnetically conductive material is used here to provide an advantageous magnetic closure.

A first cylinder-like projection 13, which extends inward from the first cover cap 12, and a second cylindrical projection 17, which extends inward from the second cover cap 16, serve to define the axial direction along which the magnet 40 is movable.

Figure 3:
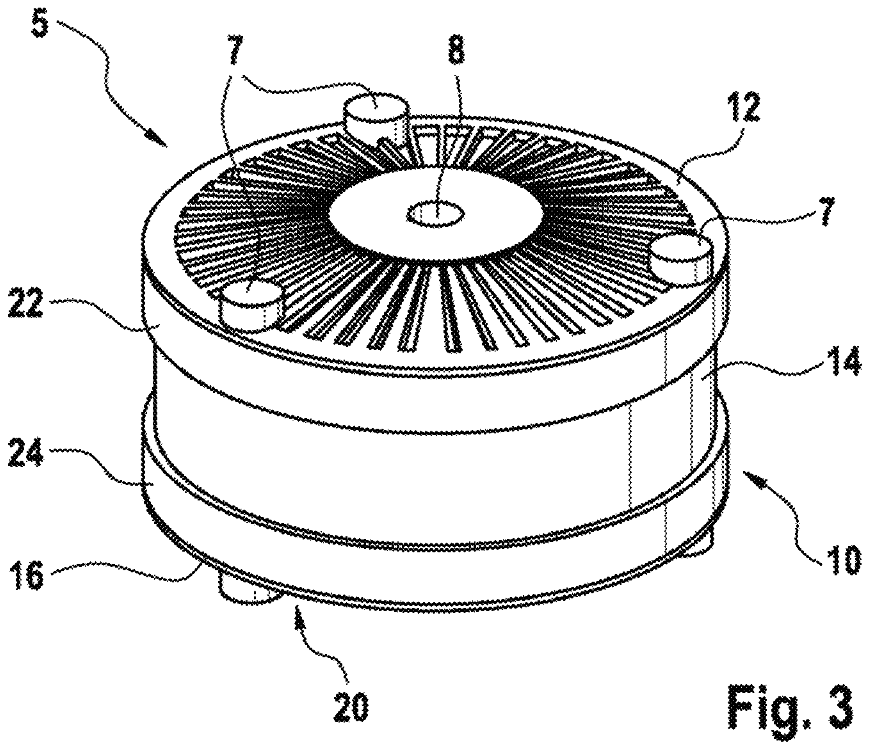
FIG. 3: shows the actuator in an assembled state.

FIG. 3 shows the actuator 5 in the assembled state. It can be seen here that three cylindrical contact points 7 are arranged on the outside of the first cover cap 12. With said contact points, the actuator 5 can adjoin a component of a motor vehicle. Furthermore, a bore 8 in which a thread is formed is arranged in the center. The actuator 5 can thus be fastened to a component. The second cover cap 16 is also configured accordingly.

By fastening or application of the actuator 5 by bore 8 to a component of a motor vehicle, the vibrations already mentioned further above, which the magnet 40 can generate, can be transmitted to the component. In this way, the component itself can be excited to vibrate, which leads to it emitting sound waves. These sound waves can typically be heard in the interior of a vehicle. In this way, sound can be generated without the provision of a separate loudspeaker, which is particularly appropriate at low frequencies and leads to a significant saving on space and weight.

It should be mentioned that, for example, the bore 8 can also be used to connect the actuator 5 to a rigid component, such as, for example, a body part of a vehicle, and the actuator 5 can be connected on the opposite side to a component which is to be excited into vibrating. In this way, the stationary component, such as, for example, a body of the vehicle, can serve as a reference, relative to which the vibrations are excited.

Figure 4:
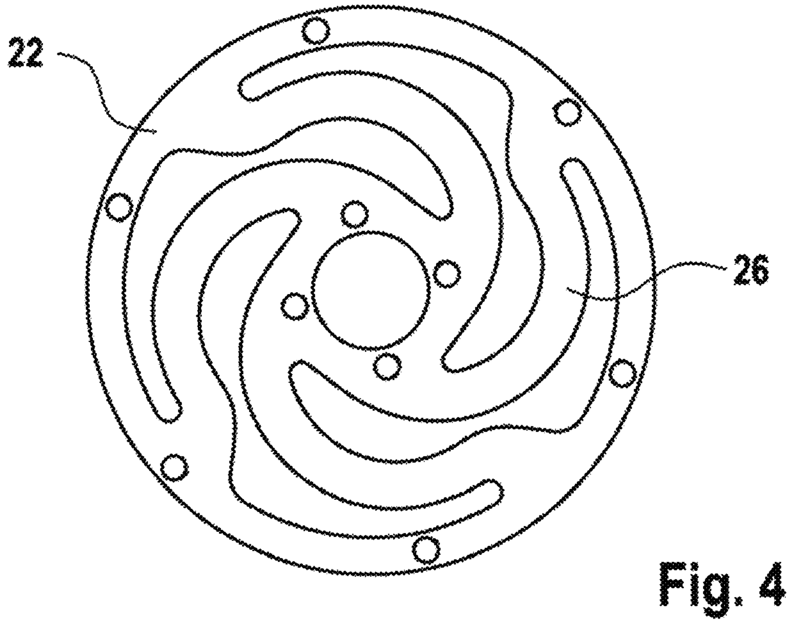
FIG. 4: shows an alternative embodiment of a spring element.

FIG. 4 shows an alternative embodiment of a spring element, here by way of example the first spring element 22. This can be used in the context of the embodiment described with reference to FIGS. 1 to 3 instead of the first spring element 22 shown there and/or instead of the second spring element 24 shown there.

In contrast to the star-shaped design which can be seen in FIG. 2, the spring arms 26 of the spring element 22 illustrated in FIG. 4 are designed in a spiral shape. A different spring characteristic can thus be achieved.

Figure 5:
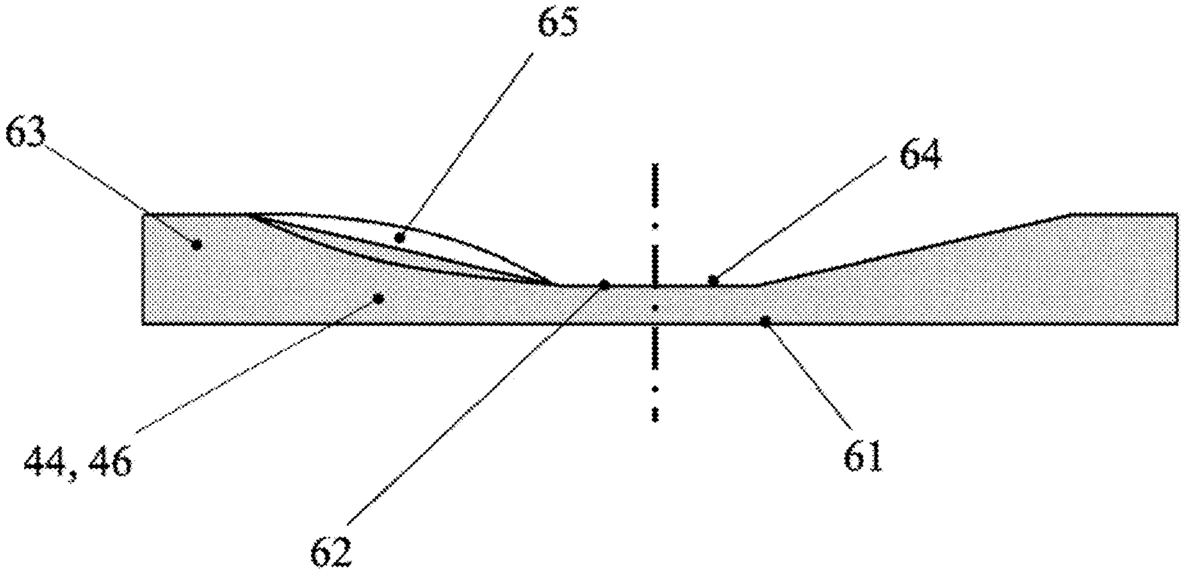
FIG. 5: shows an exemplary cross section of a pole plate.

FIG. 5 shows schematically an exemplary pole plate 44, 46 in cross section. The pole plate is, by way of example, configured to be substantially planar 61 on the side facing the magnet (not illustrated). The outer side or surface 62 facing away from the magnet is concave and thus the entire cross section of the pole plate is concave. The outer side has a collar 63 on the circumferential edge, at which collar the pole plate has a greater thickness or material thickness than in the center. The pole plate has a substantially planar plateau 64 in the region of the center of the outer side. The transition 65 between collar 63 and plateau 64 can be designed in various ways; a linear transition, a circular-arc-shaped transition and a parabolic transition are illustrated on the left-hand side by way of example.

If it is found in the course of the proceedings that a feature or a group of features is not absolutely necessary, then the applicant aspires right now to a wording of at least one independent claim that no longer has the feature or the group of features. This may be, for example, a subcombination of a claim present on the filing date or a subcombination of a claim present on the filing date that is restricted by further features. Claims or combinations of features of this kind requiring rewording are intended to be understood as also covered by the disclosure of this application.

It should also be pointed out that refinements, features and variants of aspects of the invention which are described in the various embodiments or exemplary embodiments and/or shown in the figures can be combined with one another in any desired manner. Single or multiple features are interchangeable with one another in any desired manner. Combinations of features arising therefrom are intended to be understood as also covered by the disclosure of this application.

Back-references in dependent claims are not intended to be understood as a relinquishment of the attainment of independent substantive protection for the features of the back-referenced dependent claims. These features may also be combined with other features in any desired manner.

Features which are only disclosed in the description or features which are only disclosed in the description or in a claim in conjunction with other features may in principle be of independent significance essential to aspects of the invention. They may therefore also be individually included in claims for the purpose of delimitation from the prior art.

The invention claimed is:

1. An actuator for exciting at least one component of a motor vehicle with vibrations, the actuator comprising:

a housing which is configured to be connected to the component;

an electrical coil which is rigidly connected to the housing and is configured to generate a magnetic field when an electrical current flows through the coil; and a magnet which is arranged in the housing so as to be movable to a limited extent, wherein the coil has a fixed connection to the housing by an adhesive connection of thermally relatively highly conductive adhesive, wherein said adhesive has a thermal conductivity of at least 0.8 W/(m K).

2. The actuator as claimed in claim 1, wherein the actuator has at least one first pole plate which is assigned to the magnet, wherein the outwardly directed surface of a first pole plate is concave, and therefore said surface has a greater thickness at the outer edge than in its center.

3. The actuator as claimed in claim 1, wherein the first pole plate has a collar along its outer edge, of substantially constant thickness, which can comprise up to 20% of the total extent of the pole plate.

4. The actuator as claimed claim 2, wherein that surface of the first pole plate which is oriented toward the magnet is substantially planar.

5. The actuator as claimed in claim 2, wherein the first and/or a second pole plate are/is configured with regard to their outwardly directed surface in such a way that they have a substantially planar partial surface and/or a plateau in their center.

6. The actuator as claimed in claim 1, wherein the housing of the actuator has a heat capacity of at least 0.08 kJ/K, in particular of at least 0.1 kJ/K.

7. The actuator as claimed in claim 1, wherein the layer thickness of the adhesive is a maximum of 0.3 mm.

8. The actuator as claimed in claim 1, wherein an inner surface of the housing, which is connected to the coil and/or to the coil carrier by an adhesive connection, is structured and/or profiled.

9. The actuator as claimed claim 3, wherein that surface of the first pole plate which is oriented toward the magnet is substantially planar.

10. The actuator as claimed claim 2, wherein the first pole plate has a collar along its outer edge, of substantially constant thickness, which can comprise up to 20% of the total extent of the pole plate.

11. The actuator as claimed in claim 1, wherein the housing of the actuator has a heat capacity of at least 0.1 kJ/K.

12. The actuator as claimed claim 1, wherein the layer thickness of the adhesive is less than 0.1 mm.

13. An actuator for exciting at least one component of a motor vehicle with vibrations, the actuator comprising:

a housing which is configured to be connected to the component;

an electrical coil which is rigidly connected to the housing and is configured to generate a magnetic field when an electrical current flows through the coil;

a magnet which is arranged in the housing so as to be movable to a limited extent; and a spring arrangement which is configured to bias the magnet into an inoperative position, wherein the spring arrangement is configured to bias the magnet in a manner returning same back to the inoperative position along every possible direction of movement.

14. The actuator as claimed in claim 13, wherein the spring arrangement has a first spring element and a second spring element, wherein the magnet is held between the first spring element and the second spring element, wherein the first spring element biases the magnet in a first direction and the second spring element biases the magnet in a second direction opposite to the first direction, wherein the first spring element has a number of spring arms for biasing the magnet, and/or the second spring element has a number of spring arms for biasing the magnet.

15. The actuator as claimed in claim 14, wherein the spring elements are formed from a composite material.

16. The actuator as claimed in claim 14, wherein the spring elements are coated with one or more plastics with relatively high damping or with relatively massive materials, in order to dampen and/or to detune the natural vibration behavior of the spring elements.

17. The actuator as claimed in claim 14, wherein the arrangement of the spring arms is configured symmetrically or, alternatively, configured asymmetrically, in order to prevent natural vibrations.

18. The actuator as claimed in claim 14, wherein the spring arms are profiled in order to further improve the rigidity and the vibration properties, wherein the profiling is implemented by at least one rib and/or at least one bead and/or at least one edge and/or at least one curvature.

* * * * *